UNITED STATES PATENT OFFICE.

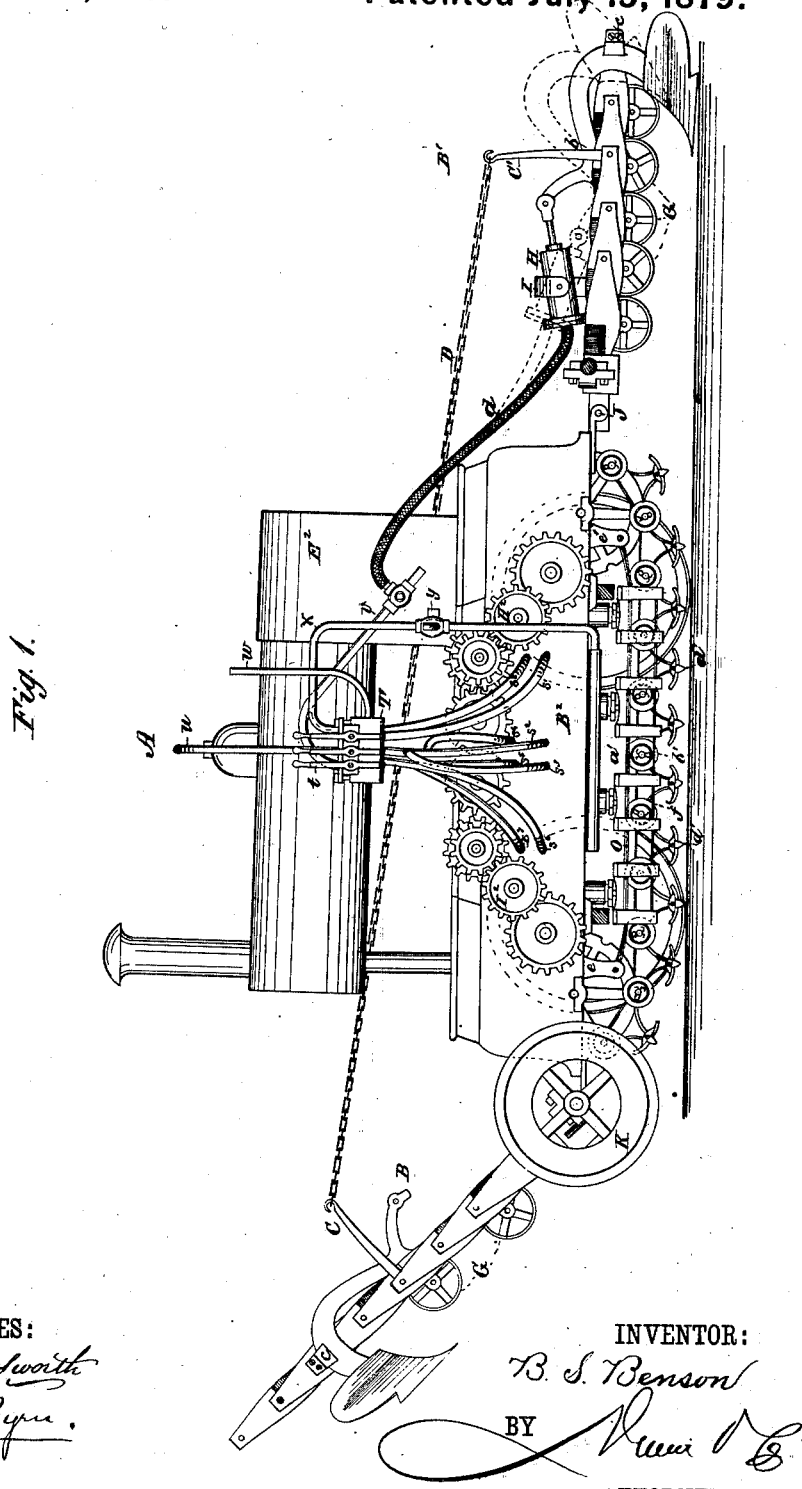

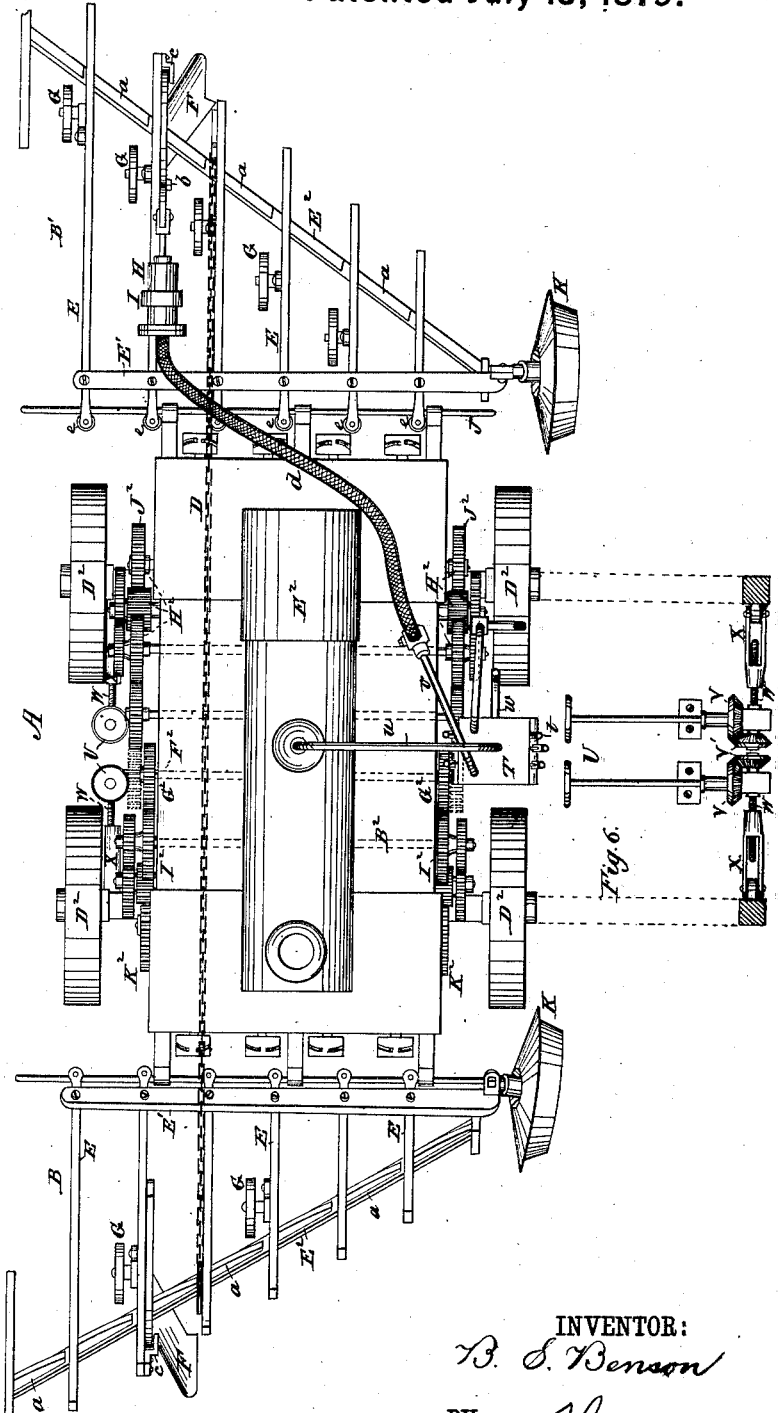

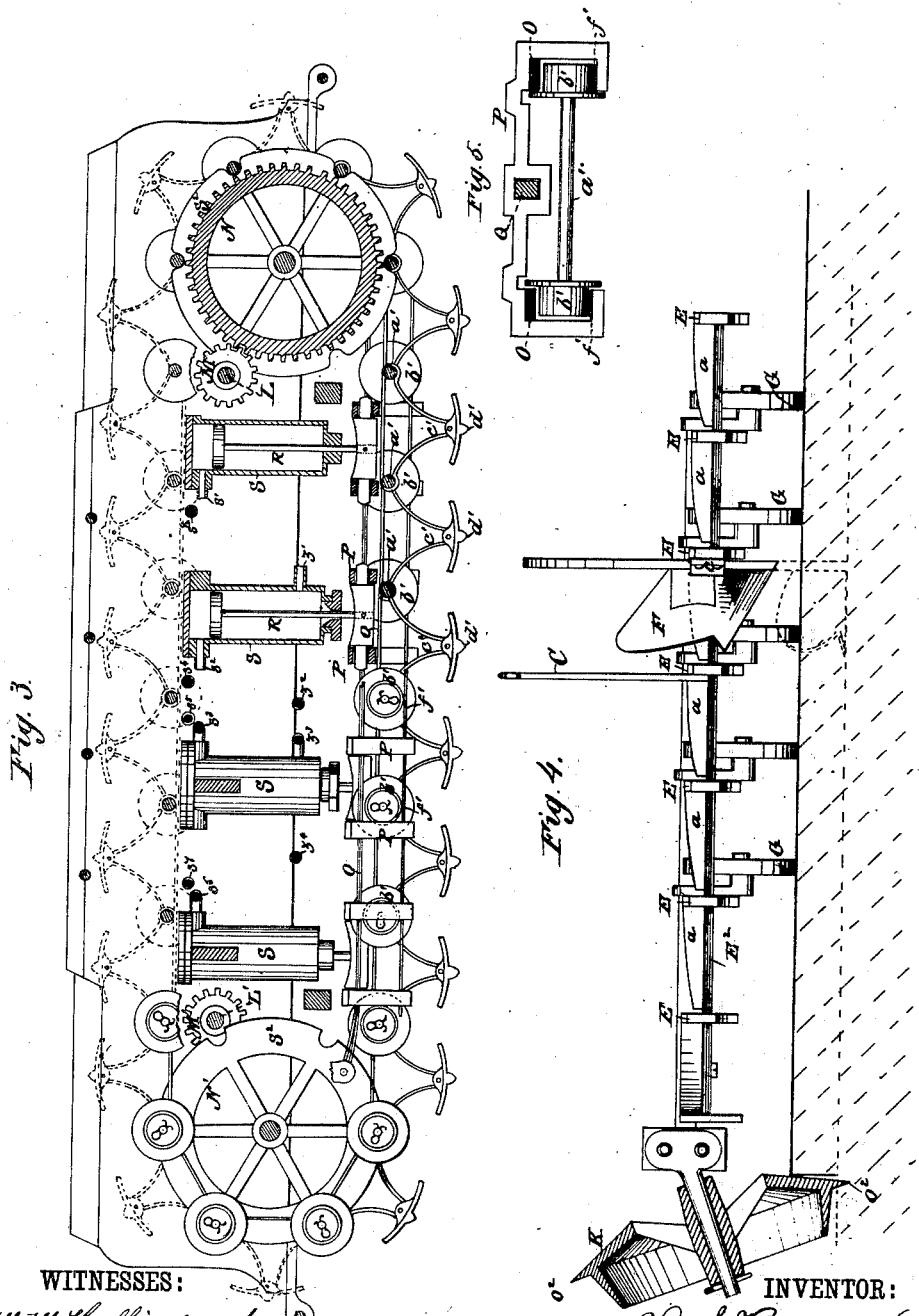

BENJAMIN S. BENSON, OF BALTIMORE, MARYLAND.

IMPROVEMENT IN TRACTION-ENGINE AND STEAM-PLOW.

Specification forming part of Letters Patent No. 217,506, dated July 15, 1879; application filed November 19, 1878.

*To all whom it may concern:*

Be it known that I, BENJAMIN S. BENSON, of Baltimore city, State of Maryland, have invented a new and Improved Combined Traction-Engine and Steam-Plow; and I do hereby declare that the following is a full, clear, and exact description of the same, reference being had to the accompanying drawings, forming a part of this specification, in which—

Figure 1 is a side elevation; Fig. 2, a plan view; Fig. 3, an enlarged detail view of the endless propelling-chain, driving-wheel, and piston, the view being partly in section. Fig. 4 is a rear detail view of the gang-frame, the guiding-wheel being in section. Fig. 5 is a detail view in transverse section of the guide for the traveling chain; Fig. 6, a detail view of the device for turning the plow.

My invention relates to a traction-engine and steam-plow combined. It is designed mainly to move backward and forward without turning around, but is also provided with means for turning when necessary. For operating plows with a back-and-forth motion I adopt the general principle of two gangs of plows arranged in relation to a traction device, one at each end, which gangs are connected by a chain, so that the weight of one set while operating holds the other up and out of contact with the ground. The plows are kept down when plowing, and kept out of ground individually or collectively when raised up, by direct and elastic steam-pressure applied to each plow through a cylinder and piston-rod, and the plows are automatically adjusted to the irregularities of the ground by connection to a flexible spring-bar, the gangs being connected to the traction device with a lateral adjustment, and held in true position by a peculiarly-constructed wheel, as hereinafter more fully described. In the traction device one or more endless chains of mounted feet are provided, moving around sprocket-wheels at the ends, and provided with friction-wheels upon their sides. This chain is forced against the ground by a uniform and controllable elastic steam-pressure applied through cylinders and piston-rods, the greater part of the weight of the engine being sustained by spring-rails which run upon the tops of the wheels of the chain as it is laid down in front and picked up in the rear of the engine. Various other details contributing to the improvement of the machine are provided, which will be more fully described hereinafter.

For the sake of greater clearness, the construction and arrangement of the gangs of plows will first be described without reference to the specific construction of the traction device, which traction device I designate generally by the letter A. B B¹ are the two gangs of plows, arranged one at each end of the machine. These gangs are constructed precisely alike, and are provided with standards C C', the tops of which are connected by a chain, D, made sufficiently short to prevent both gangs from resting upon the ground at the same time. The weight of one of these gangs when down and operating will, by reason of the relative leverage due to their positions, hold the other gang up and out of contact with the earth. This permits the plow to be run back and forth without turning all the way around, the position of the gangs being changed according to the direction of the movement of the machine, so that the rear gang is always the one which is operating. These gangs are constructed of frames composed of a series of longitudinal parallel bars, E, made of gradually-increasing length, the front ends of which are connected rigidly by a right-angular bar, E¹, and the rear ends of which are connected by an oblique and flexible spring-bar, E², constructed of a series of flat springs laid together and re-enforced at the top by rigid offsetting arms $a$ from the bars E². The plows F are arranged at the rear end of this frame in oblique position to give room for the turning of the furrows. In connecting them to the frame their beams have a downward bend, $b$, near the middle, (see Fig. 1,) at which point each plow is pivoted to its respective bar E, the rear bend of the beam being guided in the vertical motion of the plow by a keeper, $c$. G are gage-wheels fitted to a standard of each bar E, and made vertically adjustable to regulate the depth of the plows. In addition to this adjustment a yielding and variable adjustment is made for the plows in a steam-cylinder and piston, H. The cylinder is swung by trunnions in a yoke-shaped frame, I, and is connected by a pipe, $d$, with the boiler.

Now, the piston-rod being attached to the forward end of the plow-beam, it will be seen that the bend in the plow-beam and its pivotal relation to the cylinder gives to the plow a yielding movement against the cushion of steam or hot water backed by steam in said cylinder. This allows the plow to yield to obstructions and avoids breakage. By means of a cock in pipe $d$ communication with the boiler may be cut off, and the adjustment of the plow made fixed for any depth and invariable. When a plow is raised up the pivot at the end of the beam comes below the line of pivot in the center of the beam, and the cylinder thus holds the plow out of the ground, as shown in dotted lines in Fig. 1. One of the principal uses, then, of the steam-cylinder and piston is to hold one or more of the plows of the gang up when all of them are not required for use at once.

In the drawings only one plow and its connection is shown; but in practice each bar E will be similarly equipped.

For attaching the gang-frame to the traction device the forward ends of bars E are bifurcated horizontally and a grooved pulley or friction-wheel, $e$, Fig. 2, fitted between. In the fork of the bars E and in the rear of the friction-wheel is inserted the horizontal transverse bar J, rigidly fixed to the end of the frame-work of the traction device. This, it will be seen, allows lateral adjustment between the gangs and the traction device, and if the latter has any irregular movement it is taken up at this point instead of affecting the true running position of the plows. As the mold-boards of the plows all turn one way, the aggregate lateral thrust of the plows, due to the turning of the furrow, has a tendency to throw the gangs to the land-side. To counteract this tendency, I provide a peculiarly-constructed wheel, K. This wheel I locate next to the advance plow, (see Fig. 2,) and its face (next to the vertical wall of earth left by the preceding furrow) is made convex, (see Fig. 4,) so that as it binds against the side of the said wall its convex side gives it a wedging action, which presses the gang-frame laterally away from the wall of earth, and in the opposite direction to that in which it has a tendency to go. This wheel K is fitted to a vertically-adjustable axis to correspond with the depth of the furrow, and is also provided with a flange, $o^2$, which cuts into the ground at the bottom of the furrow, to give a better hold.

The traction device A will now be described. It consists of a frame-work, $B^2$, sustained at its front and rear ends by a vertical pivot upon axles whose outer ends are provided with supporting-wheels $D^2$ $D^2$.

Upon the frame-work $B^2$ is mounted a furnace and steam-boiler, $E^2$, and also an engine, which imparts a rotary motion to the transverse shaft $F^2$. As this engine is to be of the usual form it is not shown, it being readily understood that it receives its steam from the boiler and transmits rotary motion to the drive-shaft $F^2$. This shaft $F^2$ is provided at each of its ends with gear-wheels $G^2$, which are made laterally adjustable on the shaft, so as to engage either with the train of gear-wheels $H^2$, for going in one direction, or the train $I^2$, for moving in the opposite direction.

The terminal wheels $J^2$ $K^2$ at the ends of the several trains are fixed, respectively, upon the transverse shafts L L', (see Fig. 3,) journaled in bearings in the frame-work, and carrying each two other pinions, M M', which engage with the two wheels N N' at each end of the machine. These two sets of wheels are separated in the middle by a longitudinal partition, and around them pass the two endless chains for exerting the draft.

In constructing the wheels N N' they are formed with gear-teeth on their peripheries engaging with the pinions M M', and upon each side of their peripheries have flanges $S^2$, notched at regular intervals to form sprockets that receive the endless chains. These endless chains consist of transverse axial rods $a'$, carrying at their outer ends flanged friction-rollers $b'$ and triangular links $c'$, jointed to the rods $a$, and having their apices pointing outwardly, and provided each with a loosely-pivoted traction-foot, $d'$. As these chains pass around the wheels N N', from the action of the gear-wheels, the rods $a'$ seat themselves in the notches of the said wheels, and the feet $d'$ plant themselves upon the ground in front, and draw the body of the device along over the same.

Just beneath the frame of the device, upon each side of the chain, is a spring rail or track, O, secured at its ends by pendent supports $e$ $e'$. This rail consists of several flat spring-bars bound or fastened together so as to form a flexible track that rests upon the tops of the rollers of the chain. To guide these rollers properly and lift them with the feet of the chain when desired, a lower rail, $f'$, is placed beneath the friction-rollers and connected with the spring-rails by the ends of the transverse yoke-shaped pieces P, extending across the tops of the spring-rails. These yoke-shaped pieces are connected in pairs by cross-heads Q, which latter are loosely secured to the bottom ends of four piston-rods, R, for each chain contained within as many steam-cylinders S. The object of this provision is to cause any portion or all of the feet of the chain to be pressed with a greater bearing contact against the ground for increasing the traction and to lighten the pressure of the traction-engine on road-wheels, also to lift the chain away from the earth, the springing character of the rail O permitting this slight movement.

From the eight cylinders shown for both chains eight pipes, Figs. 1 and 3, $s^1$ $s^2$ $s^3$ $s^4$ $s^5$ $s^6$ $s^7$ $s^8$, lead from the space above the piston in the cylinder to the valve-box T, by which steam-pressure may be applied to or removed from any one of them by shifting the levers $t$. This valve-box communicates with the steamdome of the boiler through pipe $u$. It communicates with the cylinder for regulating the plows through pipe $v$. It also has an exhaust-pipe, $w$, and communicates, through pipe $x$ and plug-valve $y$, with four other pipes, (see Fig. 3,) $z^1$ $z^2$ $z^3$ $z^4$, which open into the four central steam-cylinders at a point below their pistons. This permits steam-pressure to be applied below the pistons to lift the feet off of the ground or permit them to drag at this point. The valves in the box T are also so arranged with their special pipes as to shut off the steam or water continually forced into them by steam in the boiler, and to exhaust the pressure in the cylinders of one chain and allow the flexible feet of that side to be relieved of pressure, so as to allow them to slip on the ground while the chain on the other side is in full traction, whereby the engine may be drawn to one side.

For more effectually turning the engine two vertical rods, U, are employed, having bevel-wheels V, which engage with other bevel-wheels, V', attached to the ends of screw-shafts W. These screw-shafts enter internally screw-threaded links X attached to the axles, so that the turning of the hand-wheels rotates the screw-shafts and turns the axles upon their vertical pivot-bolts. Now, by turning the hand-wheels, so as to throw the adjacent ends of the axles together, the machine may be made to move in a circular course.

Having thus described my invention, what I claim as new is—

1. A gang of plows attached to and combined with a continuous flexible spring-bar, forming the main cross-bar of the frame, to adapt the plows to the unevenness of the ground, as described.

2. The combination, with the plow-frame and the plow pivoted thereto, of a steam-cylinder and piston, arranged substantially as described, to apply an elastic steam-pressure to said plow, as set forth.

3. The plow having a bend in its beam at $b$ and pivoted at this point to its frame, in combination with the steam-cylinder and piston swung upon trunnions, as described.

4. The gang-frame composed of parallel bars bifurcated at their front ends and provided with horizontal friction-rollers, in combination with the traction device and a transverse rod attached to said traction device and extending through the forked ends of the parallel bars in the rear of the friction-wheels, as shown and described.

5. The flexible spring-bar and adjustable gage-wheels, in combination with the plows, as described.

6. The combination, with the plows, of the gang-frame, consisting of the parallel bars E, right-angular bar $E^1$, and oblique flexible spring-bar $E^2$, substantially as described.

7. The combination, with a gang of plows, of a wheel, K, located upon the mold-board side of the gang, and constructed with a flange, $o^2$, and a convex face adjacent to said gang, adapted to bind against the vertical wall of earth of the preceding furrow and counteract the lateral thrust of the gang, as described.

8. The endless traction-chains consisting of the axial rods $a'$, the triangular links $c'$, having their apices pointing outwardly from the center, and provided with loosely-connected feet or shoes $d'$, all combined as shown and described.

9. The combination, with the traction-chain, constructed substantially as described, and having friction-rollers $b'$, of a flexible spring-rail, O, attached to the frame-work of the machine and adapted to bear and run upon the friction-rollers of the chain as the latter is laid down in front, as specified.

10. The wheels N N', constructed with gear-teeth upon their peripheries and projecting notched flanges upon each side, in combination with the driving-pinions M M' and the traction-chain jointed by axial rods $a'$, as described.

11. The combination, with an endless traction-chain, of one or more steam-cylinders and pistons for applying an elastic steam-pressure to give greater traction to the chain or allow it to yield, as set forth.

12. The combination, with the endless traction-chain, of the rails O $f'$, the yoke-shaped frames P, the cross-heads Q connecting said yokes, and the steam piston-rods connected to said cross-heads, substantially as shown and described.

13. The combination, with the endless traction-chain and the steam-cylinders located within said chains, of the valve-box T, the communicating pipes, and operating-levers, substantially as and for the purpose described.

14. The combination of an endless traction-chain having friction-rollers, a flexible spring-rail resting upon said friction-rollers, and a steam-piston connected to said flexible rail and adapted to apply pressure to the chain, substantially as described.

BENJAMIN S. BENSON.

Witnesses:
LEVI TISCHMEYER,
JAMES H. MARRIOTT.